Patented Sept. 14, 1954

2,689,227

UNITED STATES PATENT OFFICE 2,689,227

PENICILLIN SALTS OF ANION EXCHANGE RESINS

Charles H. McBurney, Philadelphia, Pa., assignor to Rohm & Haas Company, Philadelphia, Pa., a corporation of Delaware No Drawing. Application April 25, 1952,
Serial No. 284,450

6 Claims. (Cl. 260—2.1)

This invention deals with salts of penicillin and anion-exchange resins. It deals also with a method for isolating, purifying or recovering penicillin.

With greater particularity this invention concerns on the one hand quaternary ammonium anion-exchange resins which hold on the functional groups thereof penicillinate ions, these being penicillin salts of these anion-exchange resins, and on the other hand it also concerns penicillin salts formed from penicillinic acid and anion-exchange resins having amino groups as the functional groups thereof, these resins having primary, secondary and/or tertiary amino substituents as the functional groups thereof.

Further, this invention relates to processes whereby the above salts are formed. With quaternary ammonium anion-exchange resins a solution containing penicillin is brought in contact with a said resin and the original anion of the resin is replaced by the penicillinate ion to form a resin salt. In one important aspect of this invention solutions containing penicillin are conditioned by bringing them in contact with a relatively dense quaternary ammonium anion-exchange resin in the form of a salt in which the anion is other than penicillinate and then bringing the conditioned solution in contact with an adsorbent form of a quaternary ammonium anion-exchange resin in salt form, a porous resin based on a copolymer from 99.5 to 98 parts by weight of styrene and 0.5 to 2 parts of (polyvinyl) benzene being particularly useful. The salts formed from quaternary ammonium anion-exchange resins may be represented as to the functional group by the structure

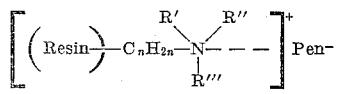

R', R'', R''' representing the quaternary-forming N-substituents and Pen⁻ the penicillinate ion.

The invention also deals with separating penicillinic acid and reacting it with a basic anion-exchange resin to form a salt. The amino-containing anion-exchange resins are the exchangers best adapted to be used in this way. They can be considered to form salts by addition of an acid molecule to the amino group. The salt thus formed can be formulated as —XN(R')(R'').H pen—; where —X represents the resin structure, R' and R'' represent hydrogen or other amine-forming substituents, and H pen represents penicillinic acid.

The present application is a continuation-in-part of my application Serial No. 96,133, filed on May 28, 1949, now abandoned, which in turn is a continuation-in-part of my application Serial No. 759,308, filed on July 5, 1947, now U. S. Patent No. 2,591,573. This patent describes the preparation of quaternary ammonium anion-exchange resins based on cross-linked styrene polymers. The aromatic rings of these polymers carry quaternary ammonium groups attached thereto through alkylene groups, usually methylene groups.

In application Serial No. 96,133, filed May 29, 1949, I have described a convenient process for isolating or purifying penicillin with the aid of quaternary ammonium anion-exchange resins. I have also there shown that these resins combine with the anion of penicillin, thereby forming an insoluble penicillin salt. Under proper conditions, as in the presence of a solution containing an electrolyte, the penicillin anion is relatively rapidly and readily released from the anion exchanger; the anion in preponderance replacing the anion of penicillin. The penicillin salt of an anion-exchange resin thus offers a means of collecting and purifying penicillin. It also becomes a source for supplying penicillin to environments in which anions from inorganic salts and the like are present for exchange. The penicillin salts of anion-exchange resins are particularly useful as supplements for animal and poultry feeds to supply penicillin.

Penicillin salts of quaternary ammonium anion-exchange resins are prepared by bringing together an aqueous solution of penicillin and a quaternary ammonium anion-exchange resin having an exchangeable anion other than that of penicillin. This anion is commonly one such as chloride, phosphate, or sulfate or one such as bicarbonate or acetate. The operation is most conveniently carried out by flowing a solution of penicillin through a bed containing the anion-exchange resin. The solution may contain from a trace of penicillin up to saturation.

Alternatively, an aqueous solution containing penicillin is treated with a quaternary ammonium anion-exchange resin. The solution may be treated with several batches of such resin to ensure practically complete removal of penicillin from solution. Subsequently used batches of resin may be used for treating a fresh solution of penicillin to increase the amount of penicillin taken up by the reactive centers of the resin. It is not, however, essential that every quaternary ammonium salt group be converted to a penicillinate group.

After the penicillin salt of an anion-exchange resin has been formed, treating solution may be rinsed therefrom. The resin may then be dried at low to moderate temperatures, desirably under reduced pressure, if it is desired that the penicillin be used in this form. If the penicillin salt is used primarily as a collecting agent, it may be freed of treating solution and the penicillinate ion eluted therefrom, as with an aqueous 5% to 10% solution of sodium chloride or a buffer solution.

The exchange step and the elution step are best performed at temperatures between 0° and 30° C. The conditions of pH of the solutions are usually held between values of 4.5 and 8.5. If lower pH's are used, then the temperature should be held low, a range of 0° to 10° C. being then generally practical. Drying is usually accomplished between 0° and 35° C., best under reduced pressure. Freeze drying may desirable be applied to remove water from the penicillin-resin salt.

The quaternary ammonium anion-exchange resins generally used in the above-described procedure are insoluble resinous compositions formed by chloromethylating a styrene-(polyvinyl)benzene copolymer containing a predominant amount of styrene and reacting the chloromethylated product with a tertiary amine. The amine is preferably one of small molecular size, such as trimethylamine, triethylamine, dimethylhydroxyethylamine, benzyldimethylamine, ethyldimethylamine, cyclohexyldimethylamine, etc., the exact nature of the nitrogen substituents not being a critical or determining factor here.

Although resins containing relatively few quaternary ammonium groups will take up penicillin at these points, it is desirable from a practical point of view to have sufficient quaternary ammonium groups on the resin nuclei to give good capacity to the resin. In general capacities are very satisfactory when two to six quaternary ammonium groups are present for every four aromatic rings, although resins are still useful with as little as one such group per 15 aromatic hydrocarbon nuclei in the copolymer. The maximum number of such groups occurs, of course, when every available position in the copolymer is chloromethylated and converted to the quaternary ammonium form by reaction with a tertiary amine.

A factor which is of interest in the formation and use of penicillin salts of the anion-exchange resins is the physical nature of these resins. When the resins are so formed as to be quite porous, they can be readily and substantially completely converted to the penicillin salt form. The penicillinate ion can apparently enter all of the pores of such resins readily and in a short time and replace the salt-forming anions first present at the site of the active groupings. With less porous resins the exchange is less readily effected and often less completely, unless the less porous resins are broken up into fine particles so that they present large surfaces upon which the exchange of anions takes place rapidly.

As I have explained in application Serial No. 96,133, copolymers of styrene made with 0.5% to 2% of divinylbenzene give finished ion-exchange resins of low density and high porosity. As cross-linking increases, either through use of higher percentages of a cross-linking agent such as divinylbenzene or other polyvinyl compound, the finished ion-exchange resin becomes more dense and the pores thereof become either smaller or fewer. Cross-linkages established through methylene groups from the halomethylating agent are somewhat intermediate in effect between the above porous resins and less porous forms now described. Copolymers from styrene copolymers produced with 4% to 8% or more of divinylbenzene are definitely more dense than those made with 0.5% to 2% of divinylbenzene. In granular form they take up less penicillin. Yet the available groups of these denser resins definitely act as centers where the penicillinate ion is exchanged for other anion. The proportion of penicillin which the denser resins take up is greatly increased as the particle size is decreased. Thus finely powdered resins of this type can be used to form penicillin salts by the batch method described above and these can hold a good proportion of penicillin on a weight basis.

A type of quaternary ammonium anion-exchange resins which are effective for exchanging anions such as chloride and the like with the penicillinate ion and which have a favorable and high capacity for such an ion is formed by proliferous polymerization as described by G. W. Bodamer in application Serial No. 226,094, filed May 12, 1951, now U. S. Patent No. 2,597,440, in the hands of a common assignee. These exchange resins are equivalent to the porous resins derived from copolymers based on styrene and divinylbenzene in weight ratios from 99.5 to 98 parts of the former to 0.5 to 2 parts of the latter.

The physical differences between quaternary ammonium anion-exchange resins made in a porous form, as with 0.5% to 2% of divinylbenzene and 99.5% to 98% of styrene, and less porous resins, such as those made with 4% to 8% or more of divinylbenzene, make possible an interesting and useful process for assisting in the recovery or preparation and isolation of penicillin.

It has been found that of the various inorganic anions and the like which are ordinarily encountered the chloride ion has the least effect upon adsorption of penicillin from its solutions. For this reason it is desirable to pass a penicillin solution containing miscellaneous ions over a relatively dense form of the anion-exchange resin in the chloride form and best in a size suitable for use in columns. Since the dense forms exchange all the usual anions and have on a volume basis somewhat better capacity than highly porous forms, passage over the dense form conditions the solution. The solution is then contacted with a porous quaternary ammonium anion-exchange resin. Alternatively, it is contacted with a finely divided anion-exchange resin which may be prepared, if desired, from a relatively dense form, best in the batch process.

For example, a solution containing 3.56 grams of sodium penicillin G per liter is passed at about 20° C. through a column containing a granular quaternary ammonium anion-exchange resin in its chloride form, this resin being derived from a copolymer of 88.77% of styrene and 11.23% of commercial divinylbenzene, of which 53.4% is in fact divinylbenzene and 46.6% is ethylvinylbenzene, through chloromethylation and reaction with trimethylamine. This resin contains 4.2% of nitrogen by analysis and has a capacity of 3.24 milliequivalents per gram or 1.29 milliequivalents per milliliter. In the passage of the solution through the column this resin takes up 0.012 milliequivalent per milliliter of penicillinate ion. The effluent from the column is passed through a column containing a quaternary ammonium anion-exchange resin similarly prepared but based on a resin from 98.5% of styrene and 1.5% of divinyl benzene. This resin has a capacity of about one milliequivalent per milliliter. This resin takes up 0.96 milliequivalent of penicillin per milliliter, as determined by iodiometric titration. The anion-exchange resin salt thus prepared contains a high proportion of penicillin in a relatively pure form. After the salt has been dried, it is stable and useful as a source of penicillin.

A solution of 90 grams of potassium penicillinate in a liter of water is passed at room temperature through a column of a porous quaternary ammonium anion-exchange resin based on a copolymer from styrene and divinyl benzene in a 99.5:0.5 ratio, which has been chloromethylated and then reacted with dimethylhydroxyethylamine to form quaternary ammonium chloride groups. This resin takes up 0.7 gram of penicillin ion per gram of resin, thus forming the penicillin salt. The resin is rinsed with deionized water, sucked free of water on a filter pad, and dried under reduced pressure with warming to about 35° C. The product is stable when stored.

A broth resulting from the culturing of *Penicillium notatum* is filtered free of solid material. It is passed over a granular resin from styrene and divinylbenzene in a 92:8 weight ratio which has been chloromethylated and reacted with benzyldimethylamine. The effluent from this treatment is passed through a column packed with a 20–50 mesh resin obtained from a copolymer of styrene and divinylbenzene in a 99:1 weight ratio, which has been chloromethylated and reacted with trimethylamine. This resin takes up 0.65 gram of penicillin ion per gram of resin to form the penicillin salt thereof. The resin is rinsed with deionized water and dried under reduced pressure. This product is stable and suitable for use in poultry or animal feeds.

Filtered broth is passed through another portion of the same porous resin in a column. The column is rinsed by upflow with deionized water. There is then slowly passed through the column a 7% solution of sodium chloride. The chloride displaces the penicillin ions. The effluent is then chilled to 0° C. and treated with cold 20% phosphoric acid to a pH of 2.5 and the acidified solution is extracted with cold butyl acetate to remove penicillinic acid from the aqueous layer. The solvent solution is washed with water which is acidified to pH 3 with a little phosphoric acid and the washed solution is treated with a solution of procaine in butyl acetate. The penicillin procaine salt precipitates and is readily separated by filtration.

A portion of the above cold butyl acetate solution of penicillin in its acid form is contacted with a finely divided quaternary ammonium anion-exchange resin prepared from a copolymer of styrene and divinyl benzene in a 95:5 weight ratio which has been chloromethylated and reacted with dimethylhydroxyethylamine to give the quaternary ammonium chloride resin which has then been treated with 5% sodium bicarbonate solution several times to yield the bicarbonate form of the exchanger. The resin and solution are separated on a filter. After the resin is sucked free of solution, it is rinsed with a little butyl acetate and with water, and dried under reduced pressure. A stable penicillin-resin salt is thus obtained which contains about 0.7 gram of penicillin ion per gram of resin.

Another portion of the cold acid extract in butyl acetate is passed very slowly through a basic resin in a porous form, prepared from styrene and divinyl benzene in a 99:1 weight ratio, the copolymer of which has been chloromethylated, treated with diethylenetriamine to form amine hydrochloride groups, and washed with a 5% sodium carbonate solution to place the resin in its basic form. A flow rate of about 0.25 to 0.5 gallon of solution per cubic foot of resin per minute is used here. The resin takes up the acid penicillin, thereby forming a penicillin salt with this anion-exchange resin. Solvent and resin salt are separated by filtration. The salt is rinsed with butyl acetate and with water and then dried under reduced pressure. The resulting product is insoluble and stable in a dry form. It is not, however, apparently as stable as the penicillin salts of quaternary ammonium anion-exchange resins and it releases penicillin more slowly than the latter resins.

In the removal of penicillinic acid from a solvent extract a very advantageous method is based on use of a powdered basic anion-exchange resin of the type used just above. Solvent solution of acid and powdered resin are mixed and stirred for 12 to 24 hours. The anion-exchange salt is thus formed. The salt formed in either way is useful for feed supplements.

Apparently penicillin is released from the above type of resin rather slowly, but over a relatively long period of time. This is believed advantageous for use of salts of this type as feed supplements.

Nitrogenous resins such as used above are available from the reaction of chloromethylated polymeric cross-linked styrene and primary or secondary amines, as described in my U. S. Patent No. 2,591,574, which issued on April 1, 1952. Instead of the resin from diethylenetriamine shown above, there may be used any of the other basic anion-exchange resins prepared by the method described in the aforesaid patent. The polyalkylenepolyamines provide one particularly interesting subclass of amino resins for forming salts with penicillinic acids. Another subclass comprises basic resins formed by reacting the chloromethylated copolymer with simple monoamines, such as dimethylamine, methylamine, diethylamine, ethylamine, benzylamine, butylmethylamine or the like, and converting the resulting hydrochloride resin to the basic form. If penicillin salts of amino resins are desired, it is preferred that the basic resin depend for activity on a tertiary amino group, as is present in the resin formed from a chloromethylated cross-linked styrene polymer and a secondary amine such as dimethylamine. These have a very favorable behavior for reacting with penicillinic acid.

The amino anion-exchange resins prepared with primary or secondary amines, like the quaternary resins prepared with tertiary amines, can be made in different densities and porosities by varying proportions of cross-linking agent and conditions of reaction. The amino resins based on copolymers from styrene and (polyvinyl)benzene in ratios from 99.5:0.5 to 97:3 by weight are definitely to be preferred for this class of exchangers.

In place of the just described amino anion-exchange resins, there may be used other anion-exchange resins, depending also on basic amino groupings for their activity and salt-forming capacity. There may be mentioned, although the properties thereof are not entirely favorable, the anion-exchange resins prepared from methylol-forming phenols, formaldehyde, and ammonia or reactive amines (i. e., those having hydrogen on the nitrogen). These resins can be made in a number of ways, all of which lead to essentially the same sort of resins having basic amine groups.

The resins of this type are sufficiently described in issued patents. For example, U. S. 2,356,151 and 2,402,384 give an adequate description of typical resins of this sort for present purposes and possible variations of these will be evident. Still other types of basic anion-exchange resins may be used to form salts with penicillinic acid. But these latter types of amino resins are not ordinarily of as great importance as the resins which are based on styrene copolymers such as described above. This may be because these latter kinds of resins do not have as suitable physical forms and also because there may be some difference in the way the penicillin group is held.

There are some additional types of weakly basic anion-exchange resins which have useful properties for forming salts with penicillinic acid. One of these is described by G. W. Bodamer in application Serial No. 226,093, filed May 21, 1951, now U. S. Patent No. 2,597,439, amino-containing anion-exchange resins being formed by proliferous polymerization. These present a very large surface in which the amino groups are fully available for forming salts with a large ion such as that from penicillin.

Another type of amino resin of value is that formed by ammonolysis of cross-linked acrylate resins with amines such as polyalkylenepolyamines. For example, ethyl acrylate is copolymerized with divinylbenzene and this copolymer is reacted with diethylenetriamine. Details of the preparation of such resins are presented in application Serial No. 282,275, filed April 14, 1952, by H. J. Schneider, and like the above-noted patent applications, this application is in the hands of a common assignee. These resins are of high capacity and are effective for forming penicillin salts with penicillinic acid.

There is a fundamental difference which should be mentioned between the class of quaternary ammonium anion-exchange resins and the class of amino resins. The former in their alkaline form exist as strong bases comparable to sodium or potassium hydroxides. The hydroxyl form of these resins should, therefore, be used with penicillins only with considerable caution. Yet because of the nature of these exchangers their free bases need not be used, for the anions of these resins can be truly exchanged for other anions, the penicillinate ion thus being capable of replacing anions such as chloride and of being replaced. If a basic quaternary ammonium exchange resin should be desired, for instance, so as to react with acid, the resin of choice to use is a quaternary resin in its bicarbonate form, for then the pH's encountered will not exceed about 8.5.

The anion-exchange resins depending for their activity upon amino groups do not have the above capability of free exchange of anions, but rather depend upon their basic character and must be used in their basic state to form salts of penicillinic acids. These salts are prepared by bringing solutions of the penicillinic acids essentially free of other acids into contact with the basic resins. The salts thus formed can gradually supply penicillin to aqueous environments in which they are placed. They, too, are suitable for supplements to animal and poultry feeds and for other uses.

A potential use of quaternary ammonium anion-exchange resins is in the recovery of penicillin from weak broths or offgrade batches or from tailings from conventional processing steps. The broths or liquors are desirably conditioned by being passed over a dense, granular quaternary ammonium exchange resin in its chloride form and then over a porous resin as shown above. Penicillin retained by the dense resin can be eluted as with a sodium chloride solution and the eluted resin reused. Alternatively, the resin can be reduced to a powder form, saturated with more penicillin, and then used as the penicillin salt.

The quaternary ammonium anion-exchange resins in a porous form make possible another important improvement in the process of preparing penicillin. Penicillin is elaborated by culturing *Penicillium notatum* or *chrosogenum* in a nutrient medium. As penicillin is developed, the broth is passed by upflow through a bed of a quaternary ammonium anion-exchange resin in the form of an inorganic salt or of a salt with an acid such as acetic. A constant side stream may, for example, be pumped from the culture up through the bed. The effluent from the bed is returned to the culture tank. In order to permit free passage of culture medium through the bed, the bed is expanded 50% to 75% by the flow of broth. This method has the advantage that the level of penicillin in the cultured broth is not permitted to become high, penicillin is removed before penicillin has long been in contact with penicillinase, and a difficult filtration problem is avoided. When the resin is sufficiently saturated with penicillin, it is washed, preferably by upflow to remove material not previously floated off. The bed is then eluted to concentrate penicillin in the effluent, as has been described, and worked up by conventional steps or both other methods, such as described above. Alternatively, the anion-exchange resin-penicillin salt may be used as such.

As nearly as can be determined all of the types of penicillin are taken up by the anion-exchange resins and while most emphasis is usually placed on penicillin G because of its marked antibiotic activity, it should be noted that other forms of penicillin, including penicillins F, K, or X, form salts with anion-exchange resins and that mixtures of the various types of penicillins can be used quite as well as the single types.

I claim:

1. A process for preparing a penicillin salt of a quaternary ammonium anion-exchange resin which comprises passing at a temperature from 0° to 30° C. an aqueous solution containing penicillin and having a pH of 4.5 to 8.5 over a relatively dense anion-exchange quaternary ammonium resin in its chloride form and then contacting the solution with a porous quaternary ammonium anion-exchange resin in the form of its chloride, said porous resin being a copolymer of 99.5 to 98 parts by weight of styrene and 0.5 to 2 parts by weight of divinylbenzene having its quaternary ammonium chloride groups attached to aromatic nuclei through methylene linkages, said quaternary ammonium chloride groups having three methyl groups as N-substituents.

2. A process for preparing a penicillin salt of a quaternary ammonium anion-exchange resin which comprises passing at a temperature of 0° to 30° C. an aqueous solution containing penicillin and having a pH of 4.5 to 8.5 over a relatively dense anion-exchange quaternary ammonium resin in its chloride form and then contacting the solution with a porous quaternary ammonium anion-exchange resin in the form of its chloride, said porous resin being a copolymer of 99.5 to 98 parts by weight of styrene and 0.5 to 2 parts by weight of divinylbenzene having its quaternary ammonium chloride groups attached to aromatic nuclei through methylene linkages, said quaternary ammonium chloride groups having two methyl groups and one hydroxyethyl group as N-substituents.

3. A process for preparing a penicillin salt of a quaternary ammonium anion-exchange resin which comprises passing at a temperature of 0° to 30° C. an aqueous solution containing penicillin and having a pH of 4.5 to 8.5 over a relatively dense anion-exchange quaternary ammonium resin in its chloride form and then contacting the solution with a porous quaternary ammonium anion-exchange resin in the form of its chloride, said porous resin being a copolymer of 99.5 to 98 parts by weight of styrene and 0.5 to 2 parts by weight of divinylbenzene having its quaternary ammonium chloride groups attached to aromatic nuclei through methylene linkages, said quaternary ammonium chloride groups having as the other N-substituents at least one member of the class consisting of methyl, ethyl, hydroxethyl, and benzyl groups.

4. A penicillin salt of an anion-exchange resin of a copolymer of 99.5 to 98 parts by weight of styrene and 0.5 to 2 parts by weight of divinylbenzene, said copolymer having quaternary ammonium groups attached to the aromatic nuclei thereof through the methylene linkage, having as N-substituents at least one member from the class consisting of methyl, ethyl, hydroxyethyl, and benzyl groups and having penicillinate ions as anions thereof.

5. A penicillin salt of an anion-exchange resin of a copolymer of 99.5 to 98 parts by weight of styrene and 0.5 to 2 parts of divinylbenzene, said copolymer having quaternary ammonium groups attached to the aromatic nuclei thereof through the methylene linkage, having three methyl groups as N-substituents, and having penicillinate ions as anions thereof.

6. A penicillin salt of an anion-exchange resin of a copolymer of 99.5 to 98 parts by weight of styrene and 0.5 to 2 parts of divinylbenzene, said copolymer having quaternary ammonium groups attached to the aromatic nuclei thereof through the methylene linkage, having two methyl groups and one hydroxyethyl group as N-substituents, and having penicillinate ions as anions thereof.

References Cited in the file of this patent

UNITED STATES PATENTS

| Number | Name | Date |
| --- | --- | --- |
| 2,479,832 | Grant | Aug. 23, 1949 |
| 2,629,710 | McBurney | Feb. 24, 1953 |
| 2,656,298 | Loewe | Oct. 20, 1953 |

OTHER REFERENCES

Cruz-Coke et al.: "Science," vol. 101 (1945), p. 340.

Penn. State Report (WPB Contract WPB-126), 44-76, August 24, 1944, 16 pp.

Penn. State Report (WPB Contract WPB-126), 44-93, October 3, 1944, 9 pp.

Penn. State Report (WPB Contract WPB-126), 44-100, October 19, 1944, 12 pp.

Penn State Report (WPB Contract WPB-126), 44-107, November 16, 1944, 7 pp.

Penn. State Report (WPB Contract WPB-126), 44-108, November 17, 1944, 9 pp.